US006847976B1

(12) United States Patent
Peace (10) Patent No.: US 6,847,976 B1
(45) Date of Patent: Jan. 25, 2005

(54) METHOD AND APPARATUS FOR SIGNIFICANCE TESTING AND CONFIDENCE INTERVAL CONSTRUCTION BASED ON USER-SPECIFIED DISTRIBUTION

(76) Inventor: Terrence B. Peace, 3924 Lauder Road, Victoria, BC (CA), V8N 4H2

(*) Notice: Subject to any disclaimer, the term of this patent is extended or adjusted under 35 U.S.C. 154(b) by 477 days.

(21) Appl. No.: 09/594,144

(22) Filed: Jun. 15, 2000

(51) Int. Cl.$^7$ .............................................. G06F 17/30
(52) U.S. Cl. ..................................................... 707/102
(58) Field of Search ........................................ 707/102

(56) References Cited

U.S. PATENT DOCUMENTS

| | | | | |
|---|---|---|---|---|
| 4,764,971 | A | * 8/1988 | Sullivan | 382/173 |
| 4,833,633 | A | 5/1989 | Morris | 708/250 |
| 5,148,365 | A | 9/1992 | Dembo | 705/36 |
| 5,301,118 | A | 4/1994 | Heck et al. | 700/109 |
| 5,464,742 | A | * 11/1995 | Swift et al. | 435/6 |
| 5,640,429 | A | * 6/1997 | Michels et al. | 375/340 |
| 5,689,587 | A | * 11/1997 | Bender et al. | 382/232 |
| 5,719,796 | A | 2/1998 | Chen | 703/13 |
| 5,722,048 | A | * 2/1998 | Javitt | 455/501 |
| 5,835,625 | A | * 11/1998 | Fitzpatrick et al. | 382/165 |
| 5,893,069 | A | 4/1999 | White, Jr. | 705/1 |
| 5,953,311 | A | * 9/1999 | Davies et al. | 370/210 |
| 5,966,312 | A | 10/1999 | Chen | 703/6 |
| 6,021,384 | A | * 2/2000 | Gorin et al. | 704/1 |
| 6,021,397 | A | * 2/2000 | Jones et al. | 705/36 |
| 6,063,028 | A | * 5/2000 | Luciano | 600/300 |
| 6,085,216 | A | * 7/2000 | Huberman et al. | 709/104 |
| 6,196,977 | B1 | * 3/2001 | Sininger et al. | 600/559 |
| 6,208,738 | B1 | * 3/2001 | Goldenfeld et al. | 380/287 |
| 6,245,517 | B1 | * 6/2001 | Chen et al. | 435/6 |
| 6,253,167 | B1 | * 6/2001 | Matsuda et al. | 703/11 |
| 6,278,981 | B1 | * 8/2001 | Dembo et al. | 705/36 |
| 6,434,511 | B1 | * 8/2002 | Stein et al. | 702/179 |
| 6,591,235 | B1 | * 7/2003 | Chen et al. | 704/236 |
| 6,636,818 | B1 | * 10/2003 | Lawrence | 702/83 |

OTHER PUBLICATIONS

Table of contents for: "Understanding Robust and Exploratory Data Analysis" (1997).
Table of contents for: "Introduction to Statistical Theory" (1971).
Table of contents for: "Distributions in Statistics", vols. 1–3 (1970).
Table of contents for: "Monte Carlo—Concepts, Algorithms and Applications" (1995).

* cited by examiner

*Primary Examiner*—Wayne Amsbury
(74) *Attorney, Agent, or Firm*—Greenblum & Bernstein, P.L.C.

(57) ABSTRACT

A computer and computer implemented method and program product for analyzing statistical data in which the data to be analyzed need not be transformed into a "Normal" distribution, thus avoiding introduction of error. Generally, the user first determines a test statistic (formula) and associated null hypothesis. Then the distribution from which the original data arose, consistent with the null hypothesis, is defined. The computer then produces numerous randomly-generated data sets of the identical size and dimensions of the original statistical data set, according to the distribution defined above. A numerical value of the test statistic is computed from the test statistic formula for each randomly generated data set and stored in a vectored array. The numerical value of the test statistic computed from the original statistical data is then compared with the array and the associated percentile determined. With this information, the significance of the numerical value of the test statistic derived from the original data can be determined and the null hypothesis may be rejected, as indicated. Embodiments of the invention may likewise be used in alternative statistical applications, including computation of confidence intervals and likelihood ratios.

19 Claims, 4 Drawing Sheets

METHOD AND APPARATUS FOR SIGNIFICANCE TESTING AND CONFIDENCE INTERVAL CONSTRUCTION BASED ON USER-SPECIFIED DISTRIBUTION

BACKGROUND OF THE INVENTION

1. Field of the Invention

The present invention relates to the analysis of statistical data, preferably on a computer and using a computer implemented program. The invention more specifically relates to a method and apparatus that accurately analyzes statistical data when that data is not "normally distributed," by which is meant, as used herein, that the data set does not correspond to a "normal probability distribution" or does not show a bell-shaped curve.

2. Description of the Prior Art

Conventional data analysis involves the testing of statistical hypotheses for validation. The usual method for testing these hypotheses, in most situations, is based on the well known "General Linear Model," which produces valid results only if the data are either normally distributed or approximately so.

Where the data set to be analyzed is not normally distributed, the known practice is to transform the data by non-linear transformation to comply with the assumptions of most statistical tests. This practice is disclosed in, for example, Haoglin, Mosteller, Tukey, UNDERSTANDING ROBUST AND EXPLORATORY DATA ANALYSIS (1977), which is incorporated herein by reference. It was previously thought that data could be transformed to comply with known distributional assumptions without affecting the integrity of the analysis. More recent research has demonstrated, however, that the practice of non-linear transformation actually introduces unintended and significant error into the analysis. See, e.g., Terrence B. Peace, Ph.D, TRANSFORMATION AND CORRELATION (2000) and TRANSFORMATION AND T-TEST (2000), which is incorporated herein by reference. A solution to this problem is needed. The subject invention therefore provides a method and apparatus capable of evaluating statistical data and outputting reliable analytical results without relying on transformation techniques.

U.S. Pat. No. 5,893,069 to White, Jr., entitled "System and method for testing prediction model," discloses a computer implemented statistical analysis method to evaluate the efficacy of prediction models as compared to a "benchmark" model. White discloses the "bootstrap" method of statistical analysis in that it randomly generates data sets from the empirical data set itself.

SUMMARY OF THE INVENTION

It is therefore an object of the invention disclosed herein to provide a method and apparatus, preferably implemented on a computer and with appropriate software, which more accurately analyzes statistical data that is distributed non-normally.

It is another object of the instant invention to provide a computer and computer implemented method and program by which statistical data can be analyzed under virtually any distributional assumptions, including normality.

It is yet another object of the invention to analyze said data without transforming the naturally occurring distribution of the original data into a Normal distribution, thereby avoiding errors which transformation may introduce into the analysis, said transformation preceding traditional data analysis techniques.

It is another object of the invention to enable and otherwise enhance sensitivity analysis to cross-check results of the analysis.

It is a further object of the present invention to provide a method and apparatus for the analysis of statistical data for use in various disciplines which rely in whole or part on statistical data analysis and forecasts, including marketing, economics, materials, administration and medical research.

It is an additional object of the present invention to provide a method and apparatus of statistical analysis which enable the user to construct new test statistics, rather than rely on those test statistics with distributions that have already been determined. The subject invention removes this restriction so that any function of the data may be used as a test statistic.

It is a further object of the present invention to provide a method and apparatus for statistical analysis that enables the user to make inferences on multiple parameters simultaneously. The instant invention will permit all aspects of more than one distribution to be tested one against the other in a single analysis and determine significant differences, if any exist.

Yet another object of the present invention is to provide a method and apparatus that enables a user to perform sensitivity analysis on the inference procedure while using all of the underlying data.

These and other objects will become readily apparent to a person of skill in the art having regard for this disclosure.

The invention achieves the above objects by providing a technique to analyze empirical data within its original distribution rather than transforming it to a Normal distribution. It is preferably implemented using a digital processing computer, and therefore a computer, as well as a method and program to be executed by a digital processing computer. The technique comprises, in part, the computer generating numerous random data sets having the identical size and dimension as the original data set, with a distribution defined to best describe the process which generated the original data set. Functions of these randomly generated data sets are compared to a corresponding function of the original data set to determine the likelihood of such a value arising purely by chance. The best mode of the invention requires input from the user defining a number of options, although alternative modes of the invention would involve the computer determining options at predetermined stages in the analysis. The method and program disclosed herein is superior to prior art in that it allows data to be analyzed more accurately, permits the data to be analyzed in accordance with any distribution (including the distribution which generated the data), avoids the errors which may be introduced by data transformation, and facilitates sensitivity analysis.

BRIEF DESCRIPTION OF THE DRAWINGS

The invention is illustrated in the figures of the accompanying drawings, which are meant to be exemplary and not limiting.

DETAILED DESCRIPTION OF INVENTION

As discussed above, the present invention supplies a computer and appropriate software or programming that more accurately analyzes statistical data when that data is not "normally distributed." The invention therefore provides a method and apparatus for evaluating statistical data and outputting reliable analytical results without relying on traditional prior art transformation techniques, which introduce error. The practice of the present invention results in several unexpectedly superior benefits over the prior art statistical analyses.

First, it enables the user to construct new and possibly more revealing test statistics, rather than relying on those test statistics with distributions that have already been determined. For example, the "t-statistic" is often used to test whether two samples have the same mean. The numerical value of the t-statistic is calculated and then related to tables that had been prepared using a knowledge of the distribution of this test statistic. Prior to the subject invention, a test statistic has been useless until its distribution has been discovered; thus, for all practical purposes, the number of potential test statistics has been relatively small. The subject invention removes this restriction; any function of the data may be used as a test statistic.

Second, the invention enables the user to make inferences on multiple parameters simultaneously. For example, suppose that the null hypothesis (to be disproved) is that two distributions arising from two potentially related conditions are the same. Traditional data analysis might reveal that the two means are not quite significantly different, nor are the two variances. The result is therefore inconclusive; no formal test exists within the general linear model to determine if the two distributions are different and that this difference is statistically significant. The present inventions will permit all aspects of both distributions to be tested one against the other in a single analysis and determine significant differences, if any exist.

Third, sensitivity analysis is a natural extension of the data analysis under the invention, whereas sensitivity analysis is extremely difficult and impractical using current methods and software. Sensitivity analysis examines the effect on conclusions of small changes in the assumptions. For example, if the assumption is that the process that generated the data is distributed as Beta (2,4), then a repeat analysis under a slightly different assumption (e.g. Beta (2,5)) should not produce a markedly different result. If it does, conclusions obtained from the initial assumption should be treated with caution. Such sensitivity analysis under the invention is simple and is suggested by the method itself.

U.S. Pat. No. 5,893,069 to White discloses a computer implemented statistical analysis method to evaluate the efficacy of prediction models as compared to a "benchmark" model. However, the invention disclosed herein is superior to this prior art in that it tests the null hypothesis against entirely independent, randomly-generated data sets having the identical size and dimension as the original data set, with a distribution defined to best describe the process which generated the original data set under the null hypothesis.

The present invention is remarkably superior to that of White, in that the present invention enables the evaluation of an empirically determined test statistic by comparison to an unadulterated, randomly produced vector of values of that test statistic. Under the disclosed invention, when the empirical test statistic falls within an extreme random-data-based range of values (e.g. above the $95^{th}$ percentile or below the $5^{th}$ percentile), the null hypothesis which is being tested can be rejected as false, with a high level of confidence that is not merited in the prior art with respect to non-normal data distributions. Therefore, the ability is greatly enhanced to determine accurately whether certain factors are significantly interrelated or whether certain populations are significantly different.

Statistical hypothesis testing is the basis of much statistical inference, including determining the statistical significance of regression coefficients and of a difference in the means. A number of important problems in statistics can be reduced to problems in hypothesis testing, which can be analyzed using the disclosed invention. One example is determining the likelihood ratio L, which itself is an example of a test statistic. When formulated so that the likelihood ratio is less than one, then the null hypothesis is rejected when the likelihood ratio is less than some predetermined constant k. When the constant k is weighted by the so-called prior probabilities of Bayes Theory, the disclosed invention encompasses Bayesian analyses as well. As related to the disclosed invention, the likelihood ratio may be generalized so that different theoretical distributions are used in the numerator and denominator.

Also, the likelihood ratio or its generalization may be invoked repeatedly to solve a multiple decision problem, in which more than two hypotheses are being tested. For example, in the case of testing an experimental medical treatment, the standard treatment would be abandoned only if the new treatment were notably better. The statistical analysis would therefore produce three relevant possibilities: an experimental treatment that is much worse, much better or about the same as the standard treatment, only one of which would result in rejection of the standard treatment. These types of multiple decision problems may be solved using the disclosed invention by the repeated use of the likelihood ratio as the test statistic.

Prediction problems may also be analyzed, whether predicting future events from past observations of the same events (e.g. time series analysis), or predicting the value of one variable from observed values of other variables (e.g. regression). The significance of the statistical model's performance, meaning the likelihood that the model would predict to the same level of accuracy due only to chance, may also be estimated. The method and program disclosed may also be used in this case and, in most practical situations, will prove to be superior.

The instant invention may also be used to determine confidence intervals, which is a closely related statistical device. Whereas hypothesis testing begins with the numerical value of the test statistic and derives the respective probability, a confidence interval begins with a range of probabilities and derives a range of possible test statistics. A common confidence interval is the 95 percent confidence interval, and ranges between the two percentiles P2.5 and P97.5. Given the symmetrical relation of the two techniques, there would be nearly identical methods of calculation. A slight modification of the disclosed method, which is obvious to those skilled in the art, enables the user to construct confidence intervals as opposed to test hypotheses, with a greater level of accuracy.

Thus, this invention relates to determining the likelihood of a statistical observation given particular statistical requirements. It can be used to determine the efficacy of statistical prediction models, the statistical significance of hypotheses, and the best of several hypotheses under the multiple decision paradigm, as well as to construct confidence intervals, all without first transforming the data into a "normal" distribution. It is most preferably embodied on a computer, and is a method to be implemented by computer and a computer program that accomplishes the steps necessary for statistical analysis. Incorporation of a computer system is most preferred to enable the invention.

Figure 1:
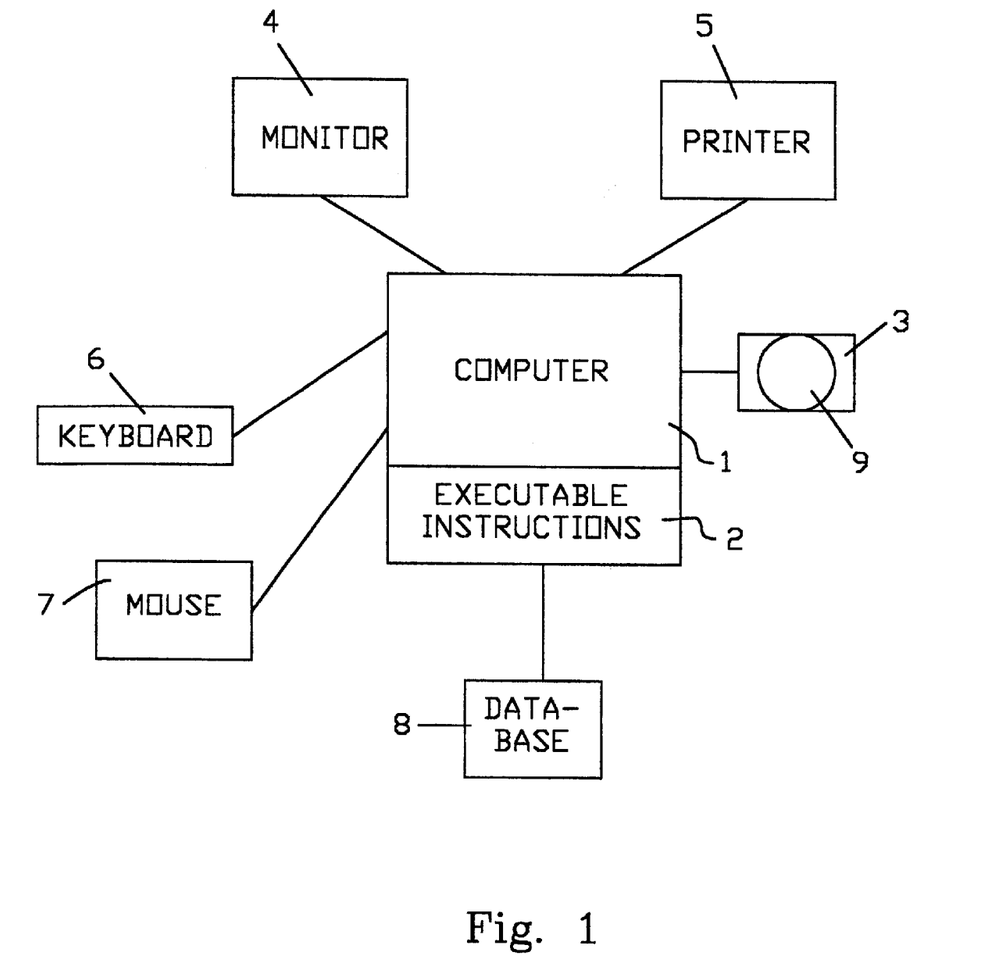
FIG. 1 is a schematic diagram of the hypothesis testing evaluation system.

Referring to FIG. 1, the computer system includes a digital processing apparatus, such as a computer or central processing unit 1, capable of executing the various steps of the method and program. In the preferred embodiment, the computer 1 is a personal computer known to those skilled in the art, such as those manufactured by IBM, Dell Computer Corporation, Hewlett Packard and Apple. Any corresponding operating system may be involved, such as those sold under the trademark "Windows." Other embodiments include networked computers, notebook computers, hand-held computing devices and any other microprocessor-driven device capable of executing the step disclosed herein.

As shown in FIG. 1, the computer includes the set of computer-executable instructions 2, in computer readable code, that encompass the method or program disclosed herein. The instructions may be stored and accessible internally to the computer, such as in the computer's RAM, conventional hard disk drive, or any other executable data storage medium. Alternatively, the instructions may be contained in an external data storage device 3 compatible with a computer readable medium, such as a floppy diskette 9, magnetic tape or compact disk, compatible with and executable by the computer 1.

The system can include peripheral computer equipment known in the art, including output devices, such as a video monitor 4 and printer 5, and input devices, such as a keyboard 6 and a mouse 7. Embodiments of the invention contemplate any peripheral equipment available to the art. Additional potential output devices include other computers, audio and visual equipment and mechanical apparatus. Additional potential input devices include scanners, facsimile devices, trackballs, keypads, touch screens and voice recognition devices.

Figure 2A:
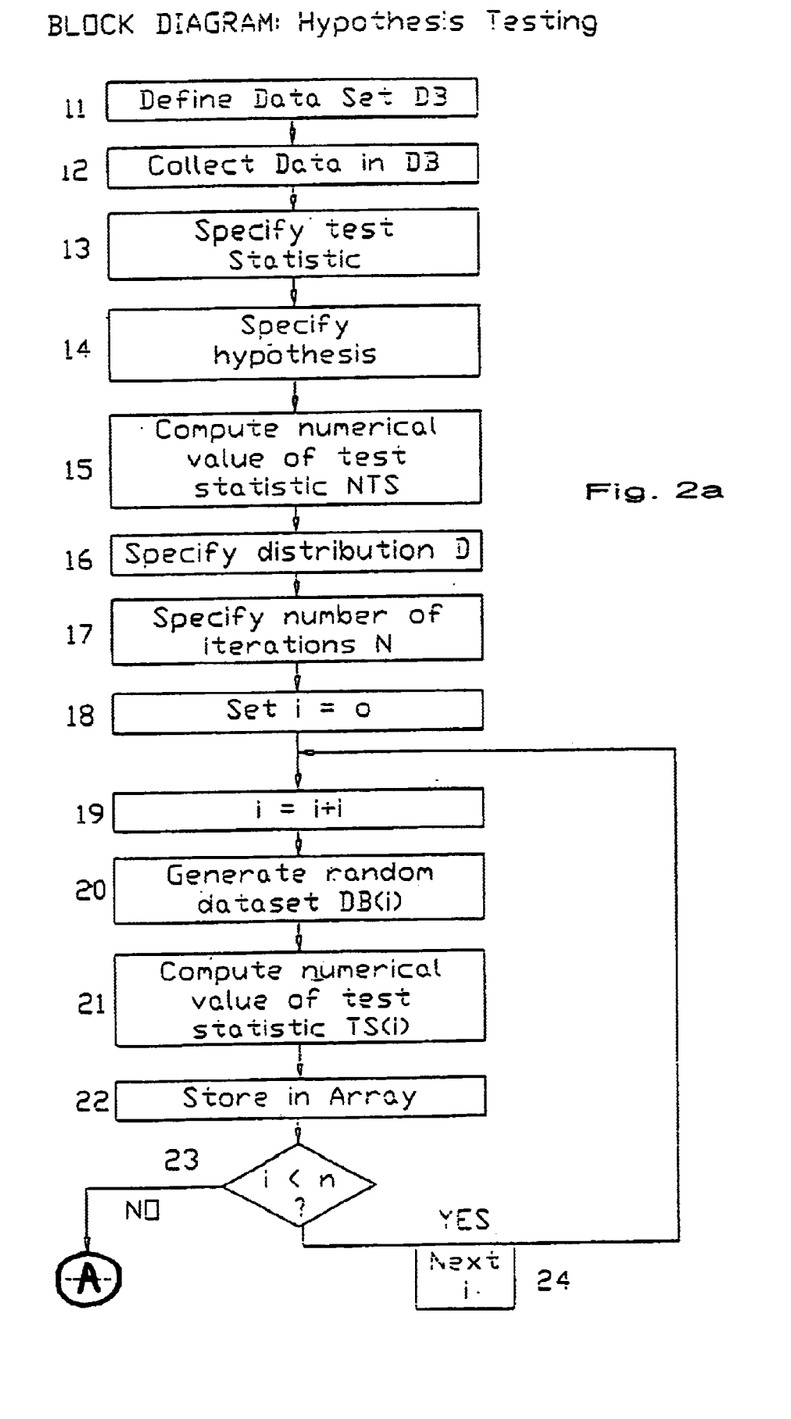
FIG. 2a and FIG. 2b depict a flow chart showing the steps for executing the hypothesis testing method and program.
Figure 2B:
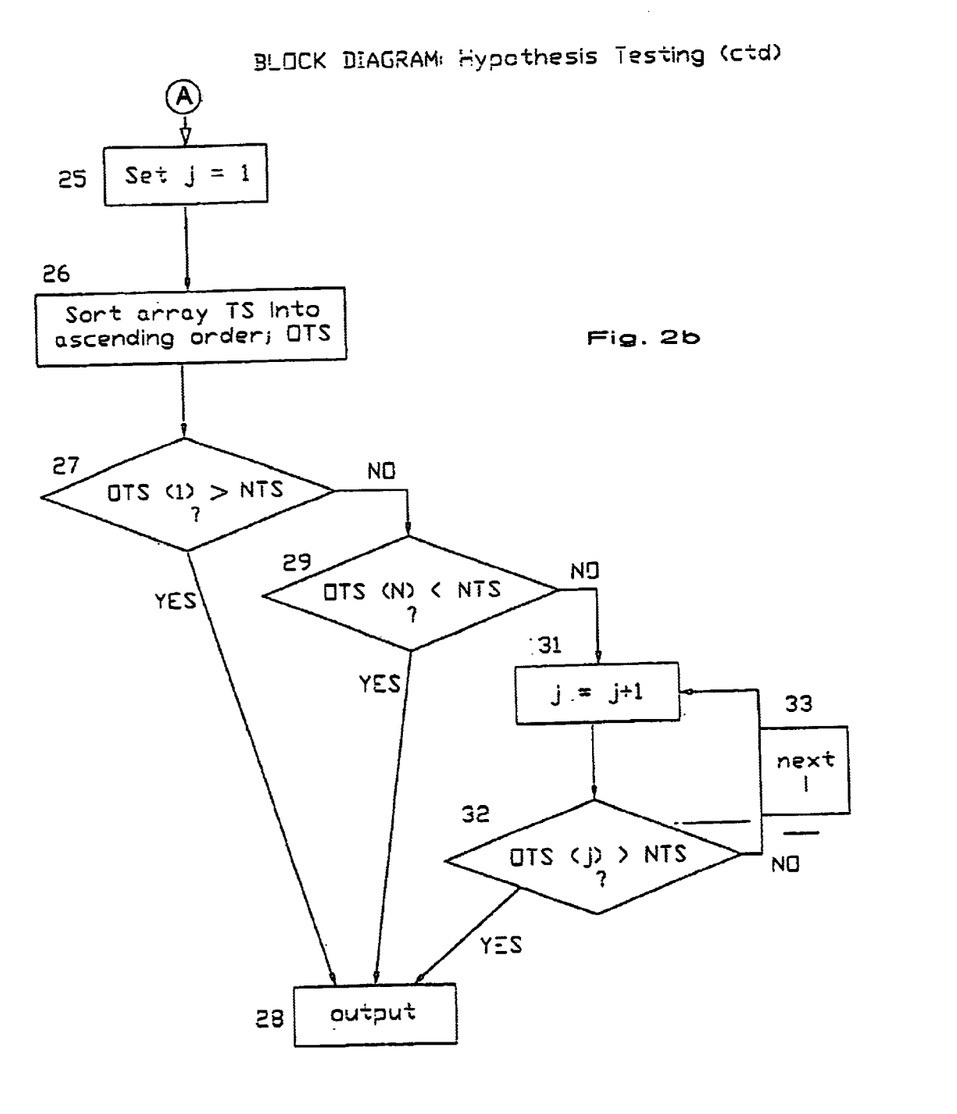

The computer executable instructions 2 begin by defining the structure of data set 11 of FIG. 2, a flowchart of the computer executable steps. The original data to be analyzed is collected into the data set 12. This original data introduced at step 12 may consist of known empirical data; theoretical, hypothetical or other synthetically generated data; or any combination thereof. The original data set 12 is stored as a computer accessible database 8 of FIG. 1. The database 8 can be internal to or remote from the computer 1. The database 8 can be input onto the computer accessible medium in any fashion desired by the user, including manually typing, scanning or otherwise downloading the database.

Referring to FIG. 2, the user specifies a test statistic 13 and formal hypothesis 14 in terms of said test statistic, in most practical cases known as the null hypothesis, concerning data set 12. The term test statistic is used to denote a function of the data that will be used to test the hypothesis. The terms "numerical value of the test statistic" and "numerical test statistic" denote a particular value calculated by using that function on a given data set. Determination of a test statistic may be accomplished by known means. See, for example, in P. G. Hoel, S. C. Port & C. J. Stone, INTRODUCTION TO STATISTICAL THEORY (1971), which is incorporated herein by reference. Examples of test statistics include a two sample t-statistic, which approximates the "Student's t-distribution" under fairly general assumptions, the Pearson product-moment correlation coefficient r, and the likelihood ratio L. Embodiments of the invention would include computing the numerical values of several test statistics simultaneously, in order to test compound hypotheses or to test several independent hypotheses at the same time.

Embodiments of the invention may include the realm of test statistics known in the art to be previously input to the computer and stored in computer accessible database 2, either internal to or remote from the computer 1. Specifying a test statistic 13 of FIG. 2 may then be accomplished by the user, when prompted in the course of program execution, selecting from the test statistic database. Likewise, the computer 1 may include executable instructions to select the test statistic 13 from the database of test statistics. It is also contemplated that the user might define their own test statistic.

The hypothesis 14, specified in terms of said test statistic 13, may take several forms. Embodiments of this invention encompass any form of statistical problem that can be defined in terms of a hypothesis. In the preferred embodiment of the invention, the formal hypothesis 14 would be a "null hypothesis" addressing, for example, the degree to which two variables represented in the original data set 12 are interrelated or the degree to which two variables have different means. However, the formal hypothesis 14 may also take any form alternative to a null hypothesis.

For example, the hypothesis may be a general hypothesis arising from a multiple decision problem, which results in the original data falling within one of three alternative possibilities. Regardless of the form, the hypothesis represents the intended practical application of the computer and computer executable program, including testing the validity of prediction models and comparing results of experimental versus conventional medical treatments.

Figure 3:
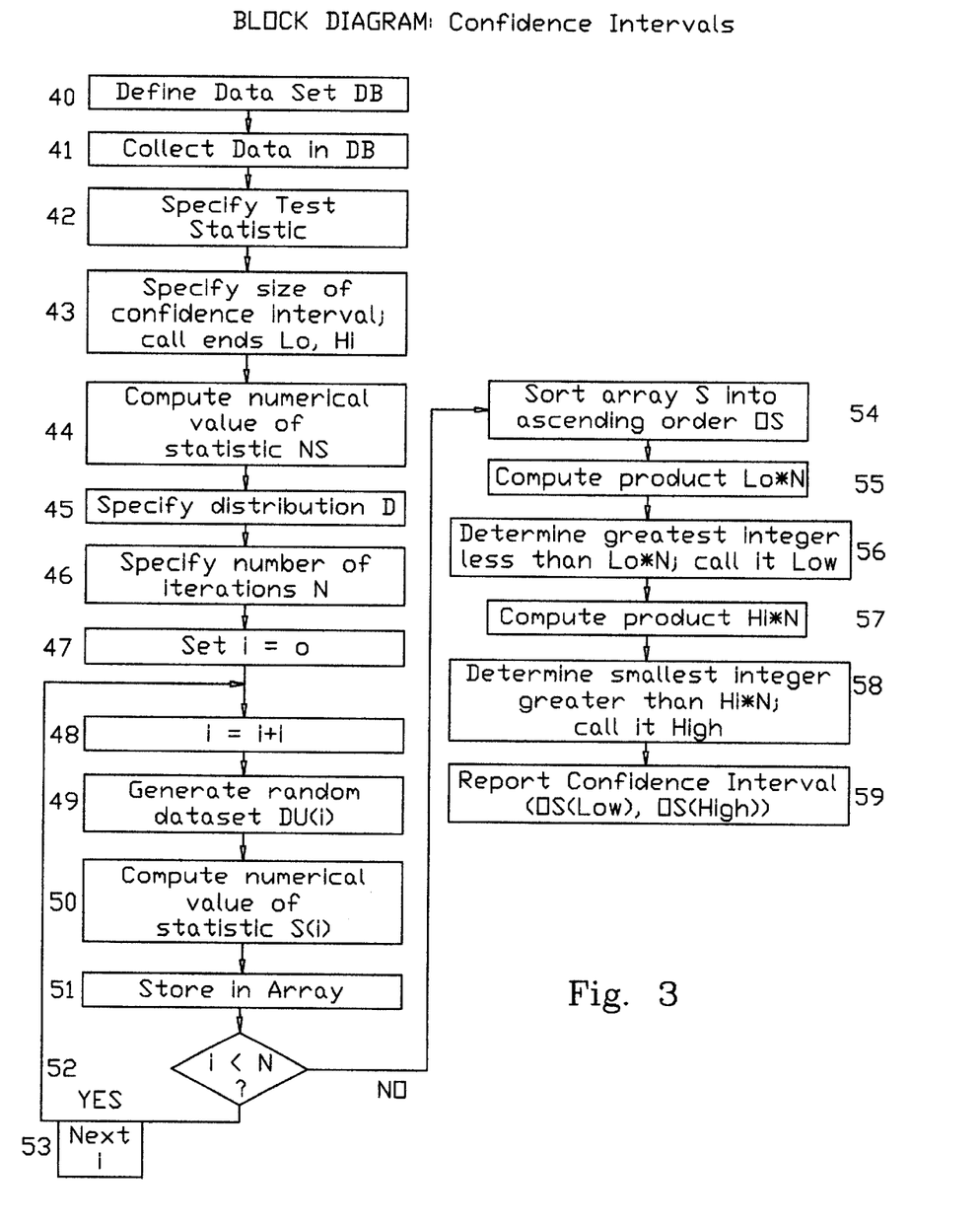
FIG. 3 is a flow chart showing of the steps for executing the hypothesis testing method and program in which the hypothesis is replaced by a confidence interval.

Using the original data set 12, the computer determines a numerical value NTS of the test statistic 13 from the data set, as indicated in block 15 of FIG. 2. Confidence intervals may also be constructed by a similar technique embodied by this invention, as indicated in FIG. 3. The primary difference between FIG. 2 and FIG. 3 relate to the interchanged roles of test statistic and probability: In hypothesis testing the probability is derived from the test statistic, while in confidence interval determination, a range of test statistics is derived from probabilities. Otherwise, the basic underlying novel concept is the same.

The disclosed invention may be seen more clearly by reference to block 16 of FIG. 2 (and block 45 of FIG. 3). In the preferred embodiment, the user specifies the probability distribution in block 16 that describes the original data set 12 under the null hypothesis 14. This distribution is the one from which the user theorizes the data may have arisen under the hypothesis 14. Conventional data analysis usually specifies the normal probability distribution, but under the disclosed invention, any distribution of data may be used to test hypothesis 14. One may appropriately specify the probability distribution from various considerations, such as theory, prior experimentation, the shape of the data's marginal distributions, intuition, or any combination thereof. The types and application of common probability distributions of statistical data sets are set forth and described in detail in various texts, including by way of example N. L. Johnson & S. Kotz, DISTRIBUTIONS IN STATISTICS, Vols. 1–3 (1970), which is incorporated herein by reference.

Embodiments of the invention include the realm of statistical distributions known in the art to be previously input to the computer and stored in computer accessible data set 8 of FIG. 1, either internal to or remote from the computer 1. The step in block 16 of specifying a distribution may then be performed by the computer based on its analysis of the original data set 12. In the alternative, the user may specify the distribution by selecting from among the previously stored database of options, or defining any other distribution, including those not previously studied.

As shown in the next block 17 of FIG. 2, the number of iterations N to be performed by the computer in analyzing the hypothesis 14 is specified. This is an integer that, in the preferred embodiment, would be no less than 1,000. The invention contemplates any number of iterations, the general rule being that the accuracy of testing the hypothesis 14 increases with the number of iterations N. Factors affecting determination of N include the capabilities of computer 1, including processor speed and memory capacity. The computer then initializes variable i, setting it to zero in step 18. This variable will correspond to each randomly produced data set performed in subsequent steps.

In the preferred embodiment, beginning at block 19, the computer then enters a repetitive loop of generating data for purposes of comparing and analyzing the original data set 12. The loop begins on each iteration with incrementing integer i by one. The computer then generates a set of random data RDS(i) at block 20 having the identical size and dimension as the original data set 12, with a distribution defined to best describe the process which generated the original data set under the null hypothesis 14. (More succinctly, the random data set will be described as having "the same size, dimension and distribution as the original data set 12.") The computer may generate the random data using any technique known to the art that approximates truly random results. The preferred embodiment incorporates the so-called Monte Carlo technique, which is described in the published text G. S. Fishman, MONTE CARLO—CONCEPTS, ALGORITHMS AND APPLICATIONS (1995), which is incorporated herein by reference.

Using this randomly generated data set, the computer determines at block 21 a corresponding numerical value TS(i) of the test statistic, which is one example of a test statistic value that might arise at random under the null hypothesis 14, distributed as distribution 16. This numerical value is stored in a numerical test statistic array 22.

At decision diamond 23, the computer compares i with the value N to determine whether they are yet equal to one another. If i is still less than N, the computer returns to the beginning of the repetitive loop as shown in block 24 and increments variable i by one at block 19. The computer then generates another set of random data RDS(i) at block 20 of the same size, dimension and distribution as the original data set 12. Using this randomly generated data set, the computer again determines at block 21 a corresponding numerical value TS(i) of the test statistic and stores TS(i) in the numerical test statistic array 22. This process is repeated until the computer determines that i equals N at the conclusion of the repetitive loop at decisional diamond 23. At that time, the computer will have stored an array consisting of N numerical values of test statistics derived from randomly generated data sets.

After the computer has stored an array of randomly generated numerical test statistics, it must determine where among them falls the numerical test statistic NTS corresponding to the original data set 12. In this process, the value of the data dependent statistic, e.g. the median or $50^{th}$ percentile, will be referred to as the "percentile value P" and the ordinal number that defines the percentile, e.g. the $95^{th}$ in $95^{th}$ percentile, will be referred to as the "percentile index p." More specifically, the computer must determine a percentile value P corresponding to NTS, so that the percentile index p may be determined. This percentile index p may then be used to infer the likelihood that the value of NTS arose by chance, which is the statistical significance of NTS.

The invention includes any manner of relating NTS with a percentile value P based on the numerical test statistic array of randomly generated results. However, a preferred embodiment of the invention is shown in blocks 25 through 33 of FIG. 2. The preferred embodiment technique begins with initializing variable j to one at block 25. The computer then sorts the numerical test statistic array into ascending order at block 26, resulting in an ordered array OTS having the same dimensions and containing the same data as the test statistic array of step 22. However, with the array arranged in an incrementally sorted format, the computer is able to systematically compare the original numerical test statistic NTS with the randomly based numbers to determine its corresponding percentile value P and associated percentile index p.

This systematic comparison begins at decision diamond 27, which first compares the numerical value NTS with the smallest numerical value in the array of stored numerical test statistics, defined as OTS(1). If NTS is less than OTS(1), then it is known that NTS is smaller than the entire set of numerical test statistics corresponding to randomly generated data sets of the same size, dimension and distribution as the original data set 12. The computer determines that NTS is in the "zeroth" percentile, indicating that the original numerical test statistic NTS is an extreme data point beyond the bounds of the randomly generated values and, therefore that the chances of the event happening by chance under a two-tailed null hypothesis are very remote. The conclusion of the computerized evaluation therefore may be to reject the null hypothesis or to re-execute the program using a higher value N to potentially expand the randomly generated comparison set.

The computer outputs its results as shown in block 28, which would include the percentile index zero of the original numerical test statistic NTS. The invention contemplates any variation of data output at the final step, in any form compatible with the computer system. A preferred embodiment is an output to a monitor 4 or printer 5 of FIG. 1 that identifies the numerical value of the test statistic NTS derived from the original data set 12, the corresponding percentile index p relating to the likelihood of NTS arising by chance, and the number of random data sets N on which p is based. In this case of NTS being less than all randomly based test statistics, p would equal zero. This raw percentile value may also be interpreted in terms of the null hypothesis 14; in the case of a two-tailed test, such an extreme value would lead to rejecting the null hypothesis, while in a one-tailed test this could lead to accepting the null hypothesis.

If at decision diamond 27 the computer determines that OTS(1) is not greater than NTS, it moves to decision diamond 29, which tests the other extreme. In other words, the computer determines whether NTS is larger than the highest value OTS(N) of the numerical test statistics corresponding to randomly generated data sets having the same size and dimension as the original data set 12. If the answer is yes, then the computer determines that NTS is in the "one hundredth" percentile, usually indicating that the null hypothesis should be rejected because the test statistic is statistically significant (i.e. not likely to have resulted from chance). The results are then output as described above and as provided in block 28 of FIG. 2.

If NTS does not fall beyond either extreme, the computer moves, to a repetitive loop, consisting of steps 31 through 33, which brackets NTS between two numerical test statistics arising from randomly generated data. First, the variable j is incremented by 1 at block 31. Then, at decision diamond 32, the computer determines whether the numerical value OTS(j) is larger than the numerical value NTS. If not, the computer returns to the beginning of the loop at block 31, as indicated by block 33, increments j by one, and again compares the numerical value OTS(j) with NTS. This process is repeated until OTS(j) is larger than NTS, which means that NTS falls between OTS(j) and OTS(j−1). The percentile value P and associated percentile index p therefore correspond to this positioning of NTS on the ordered array OTS of test statistics corresponding to randomly generated data sets. Once these bracketing values are known, the computer proceeds to output the results.

The output of a preferred embodiment will be a function of percentile indices. The percentile indices corresponding to the percentile values which bracket NTS are described as being between (j−1)/N×100 percent and j/N×100 percent. For example, if the repetitive loop of blocks 31 through 33 determines that OTS(950) out of a set of 1000 numerical test statistics arising from respective randomly generated data sets is the lowest value of OTS(j) higher than NTS, then the value of NTS lies between the percentile values with indices 949/1000×100% and 950/1000×100%, or indices 94.9% and 95.0%, which allows the conclusion that 94.9%<P<95.0%, where P in this case refers to the probability rather than the percentile, although of course the two are closely related. Probability P is estimated by the percentile indices. As described above, this information regarding the value of probability P is output from the computer among other relevant data as shown in block 28.

The output probability P estimates the likelihood that the original numerical value of the test statistic might have arisen from random processes alone. In other words, the computer determines the "significance" of the original numerical test statistic NTS. For example, if the computer determines that NTS is within the 96$^{th}$ percentile among the numerical ordered test statistic array OTS, it may be safe to conclude that it did not occur by chance, but rather has statistical significance in a one-tailed test (i.e. it is significant at the 4 percent level). Based on this information, the original hypothesis 14, whether it refers to a prediction model or a relationship between two variables represented in the original data set 12, may be rejected.

FIG. 3 shows a related embodiment using the same theory regarding generation of random data sets of the same size and dimension as the original data set 41, and distributed according to the specified distribution 45. Although the term "test statistic" is usually associated with hypothesis testing, this term will be retained in the discussion of confidence intervals in order to emphasize the essential similarity of the two procedures. As before, the term "test statistic" will be used to denote some function of the data to be found in the data set, e.g. arithmetic mean, and will be used to subsume terms such as "estimator" and "decision function." The initialization is identical as that shown in FIG. 2, except instead of specifying a null hypothesis at block 14, the user specifies the size of the confidence interval at block 43, having ends of the interval defined as "Lo" and "Hi." As a practical matter, the confidence interval specified at this step usually would be symmetrical of size 95 percent. This means that, in this mode, the disclosed invention will identify the two values of the test statistic between which the observed numerical value NTS of the test statistic is 95 percent likely to occur. The corresponding value of "Lo" is 0.025 and the corresponding value of "Hi" is 0.975 (which defines an interval of size 0.950, or a 95 percent interval).

After the confidence interval is specified, the disclosed invention continues as shown in FIG. 2 and described above. The numerical value of the test statistic is calculated at block 44, the distribution is specified in block 45, the number of iterations is specified at block 46 and an array of random data sets and the array of corresponding numerical values of the test statistic are generated in the repetitive loop of blocks 48 to 53. In a preferred embodiment, the numerical statistic array is then sorted at block 54 into ascending order to accommodate analysis of the numerical value of the statistic specified in block 42 and calculated in block 44.

Hereafter, the process is customized to the extent necessary to format usable and appropriate output from the computer. Blocks 55 through 58 determine the numerical values defining the high and low endpoints of the desired confidence intervals. At blocks 55 and 56, the computer determines which two values of OS to use in calculating the lower limit of the confidence interval, by multiplying Lo by N and identifying the greatest integer less than or equal to that product. That integer and its successor are used to identify the required values of OS. Assuming that N was specified as 1000, with a symmetric 95 percent confidence interval, in the preferred embodiment, the values of OS would be 0.025×1000=25, and the next higher value, 26. The lower endpoint of the confidence interval would be given by a function f of these two OS values, f(OS(25), OS(26)).

Similarly, at blocks 57 and 58, the computer determines which two values of OS to use in calculating the upper limit of the confidence interval, by multiplying Hi by N and identifying the smallest integer greater than or equal to that product. That integer and its successor are used to identify the required values of OS. Again assuming N is equal to 1000 and the confidence interval is symmetrical, in the preferred embodiment, the values of OS would be 0.975× 1000, and its successor, 976. The upper endpoint of the confidence interval would be given by a function g of these two OS values, g(OS(975), OS(976)). Note that the functions f and g will depend on the current statistical practice and the philosophy the developer, but will typically be functions such as maximum, minimum, or linear combination. The final step of the confidence interval analysis is to output the relevant data, as shown in block 59.

While the invention as herein described is fully capable of attaining the above-described objects, it is to be understood that it is the preferred embodiment of the present invention and is thus representative of the subject matter which is broadly contemplated, that the scope of the present invention fully encompasses other embodiments which may become obvious to those skilled in the art, and that the scope of the present invention is accordingly to be limited by nothing other than the appended claims.

What is claimed is:

1. An apparatus for analyzing statistical data, said apparatus comprising a computing device having an input device; a data storage device in communication with said computing device; and programming code means readable by said computing device which a. receives a set of original statistical data in a data set DB;
   b. receives a test statistic formula by which said data set DB will be analyzed;
   c. receives a hypothesis in terms of said test statistic formula defining one of a property and a potential relationship among data contained in said data set DB;

d. calculates the numerical value NTS of said test statistic formula using said data set DB;

e. receives a probability distribution D relating to said statistical data set DB;

f. initiates an index i;

g. generates a random data set RDB(i) that is the same size and dimension as said data set DB and distributed according to said probability distribution D;

h. calculates the numerical value TS(i) of said test statistic formula using said randomly generated data set RDB(i);

i. stores, in said storage device, said numerical value TS(i) of said test statistic formula in a numerical test statistic array;

j. increments the index i and repeats steps g through i N times to create randomly generated data sets RDB(1) through RDB(N), calculates, for each random data set, a corresponding numerical value of its test statistic TS(1) through TS(N), and stores each numerical test statistic in said numerical test statistic array in said data storage device;

k. compares said numerical value NTS with said numerical test statistic array to determine a set of percentile values P corresponding to said numerical value NTS and an associated set of percentile indices p; and l. output, by a computer output device, of a probability estimated from said set of percentile indices p to be used to accept or reject said hypothesis.

2. The apparatus of claim 1, further comprising programming code means readable by said computing device which specifies a confidence interval, having a low end and a high end, in place of said hypothesis at step c.; determines numerical values corresponding to the low end and the high end of said confidence interval from said numerical test statistic array following step j.; and outputs said confidence interval, defined by its low end and high end, and said numerical value NTS.

3. The apparatus of claim 1, further comprising programming code means readable by said computing device which generates said random data sets RDB(1) through RDB(N) in a single step, followed by programming code means for determining and storing in said numerical test statistic array in said computer data storage device each respective numerical value TS(1) through TS(N) using said randomly generated data sets.

4. The apparatus of claim 1, further comprising programming code means readable by said computing device which sorts said numerical test statistic array into ascending order from a lowest value OTS(1) to a highest value OTS(N) and determines between which two values said numerical value NTS falls, which identifies at least one percentile index p which is used to estimate said probability.

5. The apparatus of claim 1, further comprising programming code means readable by said computing device which sorts said numerical test statistic array into descending order from a highest value OTS(1) to lowest value OTS(N) and determines between which two values said numerical value NTS falls, which identifies at least one percentile index p which is used to estimate said probability.

6. The apparatus of claim 1, further comprising programming code means readable by said computing device which calculates the total number GDS of numerical values TS(1) through TS(N) greater than the numerical value NTS, determines the total number LDS of numerical values TS(1) through TS(N) less than the numerical value NTS, and derives said probability P from said GDS and said LDS.

7. The apparatus of claim 1, further comprising programming code means readable by said computing device which generates said random data sets RDB(1) through RDB(N) using random processes expressed in a Monte Carlo technique.

8. The apparatus of claim 1, further comprising programming code means readable by said computing device which receives and stores a plurality of probability distributions in said computer data storage device and determines said probability distribution D by comparing said original data set with said plurality of stored probability distributions.

9. The apparatus of claim 1, further comprising programming code means readable by said computing device which derives the probability distribution D relating to said statistical data set DB.

10. A method for analyzing statistical data, comprising the steps of:

a. collecting said statistical data in a data set DB;

b. specifying a test statistic formula by which said data set DB will be analyzed;

c. specifying a hypothesis in terms of said test statistic formula defining one of a property and potential relationship among data contained in said data set DB;

d. computing the numerical value NTS of said test statistic formula using said data set DB;

e. specifying a probability distribution D relating to said statistical data set DB;

f. initiating an index i;

g. generating random data to create a random data set RDB(i) that is the same size and dimension as said data set DB and distributed according to said probability distribution D;

h. computing the numerical value TS(i) of said test statistic using said randomly generated data set RDB(i);

i. storing said numerical value TS(i) of said test statistic in a numerical test statistic array;

j. incrementing index i and repeating steps g through i N times to create randomly generated date sets RDB(1) through RDB(N), to determine, for each random data set, a corresponding numerical value of its test statistic TS(1) through TS(N), and to store each numerical test statistic in said numerical test statistic array;

k. comparing said numerical value NTS of said test statistic with said numerical test statistic array to determine a set of percentile values P corresponding to said numerical value NTS and an associated set of percentile indices p; and l. determining whether to accept or reject said hypothesis based on a probability estimated from said set of percentile indices p to be used to accept or reject said hypothesis.

11. The method of claim 10 further comprising the steps of: specifying a confidence interval, having a low end and a high end, in place of said hypothesis in step c.; determining numerical values of the low end and the high end of said confidence interval from said numerical test statistic array following step j.; and determining whether said numerical value NTS is within the confidence interval defined by said numerical values corresponding to the low end and the high end of said confidence interval.

12. The method of claim 10, in which the steps of generating said random data sets RDB(1) through RDB(N) is performed in a single step, followed by the steps of computing and storing in said numerical test statistic array each respective numerical value TS(1) through TS(N) using said randomly generated data sets.

13. The method of claim 10, in which the step of comparing said numerical value NTS of said test statistic with said numerical test statistic array to determine a percentile index p is accomplished by sorting said numerical test statistic array into ascending order from lowest value OTS (1) to a highest value OTS(N) and determining between which two values said numerical value NTS falls, which identifies at least one percentile index p which is used to estimate said probability.

14. The method of claim 10, in which the step of comparing said numerical value NTS of said test statistic with said numerical test statistic array to determine a percentile index p is accomplished by sorting said numerical test statistic array into descending order from a highest value OTS(1) to a lowest value OTS(N) and determining between which two values said numerical value NTS falls, which identifies at least one percentile index p which is used to estimate said probability.

15. The method of claim 10 in which the step of comparing said numerical value NTS of said test statistic with said numerical test statistic array to determine a percentile index p is accomplished by determining the total number GDS of numerical values TS(1) through TS(N) less than the numerical value NTS, and derives said probability from said GDS and said LDS.

16. The method of claim 10, in which the steps of generating said random data sets RDB(1) through RDB(N) are accomplished using random processes expressed in the Monte Carlo technique.

17. The method of claim 10, in which the steps are implemented by a computing apparatus comprising a computing device having an input device, a data, storage device in communication with said computing device, and programming code means readable by said computing device.

18. A method for analyzing an original statistical data set, the original statistical data set having a size, a dimension and a distribution in accordance with a specified probability distribution, the method comprising:

generating a plurality of random data sets, each random data set having the size, the dimension and the distribution of the original statistical data set;

calculating a plurality of numerical values of test statistics corresponding to the plurality of random data sets, each numerical value being calculated according to a test statistic formula;

determining a relationship between the plurality of numerical values and a numerical value of a test statistic of the original data set, calculated in accordance with the test statistic formula;

determining a plurality of percentile values based on the plurality of numerical values with the numerical value of the test statistic of the random data sets; and determining a plurality of percentile indices corresponding to the plurality of percentile values;

wherein the relationship between the plurality of numerical values to the numerical value of the test statistic of the original data set is determined based on the plurality of percentile values and the corresponding percentile indices.

19. The method for analyzing the original statistical data set according to claim 18, in which the relationship determined based on the plurality of percentile values indicates whether the original statistical data set is characterized by at least one factor that is not based on chance.

* * * * *

UNITED STATES PATENT AND TRADEMARK OFFICE
CERTIFICATE OF CORRECTION

PATENT NO.    : 6,847,976 B1
DATED         : January 25, 2005
INVENTOR(S)   : T. Peace It is certified that error appears in the above-identified patent and that said Letters Patent is hereby corrected as shown below:

<u>Title page,</u>
Item [56], Reference Cited, OTHER PUBLICATIONS, were omitted and should be included:
-- Unpublished paper by Terrence B. Peace, Ph.D., entitled "Transformation and Correlation," dated February 5, 2000.
   Unpublished paper by Terrence B. Peace, Ph.D., entitled "Transformation and T-Test: Preliminary Results," dated February 6, 2000. --.

Signed and Sealed this

Twenty-fifth Day of October, 2005

JON W. DUDAS
*Director of the United States Patent and Trademark Office*